United States Patent [19]

Reichen et al.

[11] 4,027,955

[45] June 7, 1977

[54] SOUND-CINE-CAMERA

[75] Inventors: Willi Reichen, Yvonand; Robert Aste, Yverdon, both of Switzerland

[73] Assignee: Bolex International SA, Ste-Croix, Switzerland

[22] Filed: Sept. 23, 1975

[21] Appl. No.: 616,046

[30] Foreign Application Priority Data

Sept. 24, 1974 Switzerland ............... 12933/74

[52] U.S. Cl. ........................... 352/72; 352/27; 352/174
[51] Int. Cl.² .................................. G03B 23/02
[58] Field of Search ............. 352/72, 174, 27, 12, 352/5

[56] References Cited

UNITED STATES PATENTS

| | | | |
|---|---|---|---|
| 3,825,327 | 7/1974 | Kosarko | 352/72 |
| 3,880,504 | 4/1975 | Marvin | 352/72 |

OTHER PUBLICATIONS

T920009, Kosarko, Mar. 5, 1974, 352/72, Def. Pub.

*Primary Examiner*—Monroe H. Hayes
*Attorney, Agent, or Firm*—Fleit & Jacobsen

[57] ABSTRACT

A camera adapted for use with either a silent-film cartridge or a sound-film cartridge of larger size and having sound recording means including a capstan and a pressure roll movable into and out of engagement with the sound film against the capstan with a sensing means actuated by the sound-film cartridge inserted into the camera for permitting the actuation of a release mechanism for movement, through a mechanical linkage, of the pressure roll into engagement with the sound-film against the capstan and for deactivating the release mechanism upon insertion of a silent-film cartridge into the camera to permit disengagement of the pressure roll from the capstan.

2 Claims, 4 Drawing Figures

SOUND-CINE-CAMERA

The invention relates to a sound-cine-camera having a compartment in which a cartridge including a cine-film having a magnetic sound-track is insertable, the camera further having a releaser by means of which sound recording means of the camera are controllable, for example a pressure roll for a capstan, via a power-transfer-train,

BACKGROUND OF THE INVENTION

Such cameras are already known. Due to the greater thickness of the sound-film tracked with the magnetic track, the cartridges of sound-film are larger than cartridges for silent-film. In principle, it is possible to insert a smaller silent-film cartridge into the larger compartment for the sound film cartridge. It is a disadvantage, however, that all the sound recording means, which normally are operated by the releaser and are, of course, important only for the tracked sound-film, are operated superfluously also with insertion of a silent-film cartridge. Thereby a higher wear on the sensitive sound recording parts results. Particularly, such wear appears at the surface of the pressure roll.

SUMMARY OF THE INVENTION

With the invention, these disadvantages are overcome in that the compartment is formed to receive selectively a cartridge of smaller dimensions containing silent-film without magnetic sound track or a cartridge of greater dimensions containing sound-film with a magnetic sound-track, and that sensing means for detecting the type of the cartridge inserted in the compartment are connected with at least one member of the power-transfer-train between the releaser and the sound recording means, particularly with a releasable coupling or with a locking device, whereby with a silent-film cartridge inserted in the compartment, at least a part of the sound recording means, preferably the pressure roll, is kept out of operation.

BRIEF DESCRIPTION OF THE DRAWINGS

Further details of the invention will become apparent from the description of the embodiments schematically illustrated in the drawings in which.

Figure 1A:
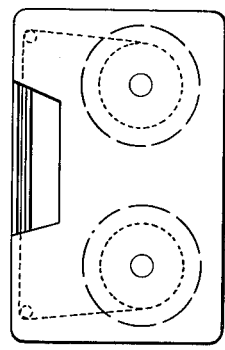
FIG. 1A is a side elevation view of a silent-film cartridge.
Figure 1B:
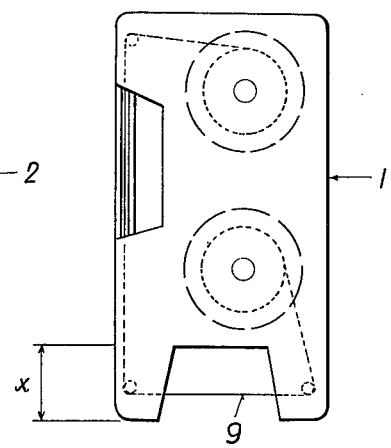
FIG. 1B is a side elevation view of a sound-film cartridge.
Figure 2:
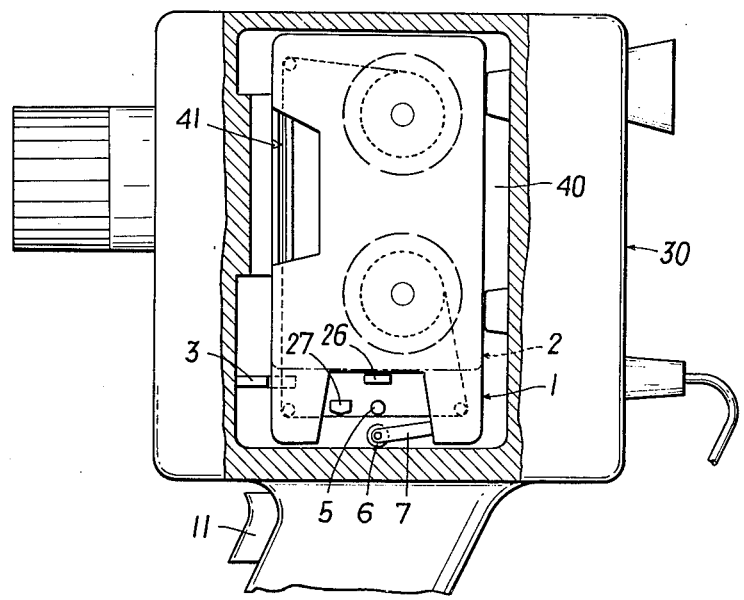
FIG. 2 is a side elevation view, partially broken away, of a cine-camera with sensing means for film cartridges.

A silent-film cartridge 2 according to FIG. 1A differs from a cartridge 1 containing a film 9 adapted for an additional sound recording and being provided with a sound track in that the latter is longer than the cartridge 2 by an amount $x$. With the insertion in a camera 30, the cartridge 1 will therefore extend over a larger space within the compartment 40 than the cartridge 2. For holding the silent-film cartridge 2 within the compartment 40, a bar 26 is provided. Within the compartment 40, there is provided a capstan 5 together with a pressure roll 6, a magnetic head 27 forming part of the sound recording means as well as a claw tooth 41 cooperating with the film 9 of a cartridge 1.

A sensing lever 3 (FIG. 3) extends into the compartment and is pivotable about a fixed axis 4 between either the position drawn in heavy lines or the dash-dotted position under the action of a spring 20 according to the cartridge 1 or 2 inserted.

Figure 3:
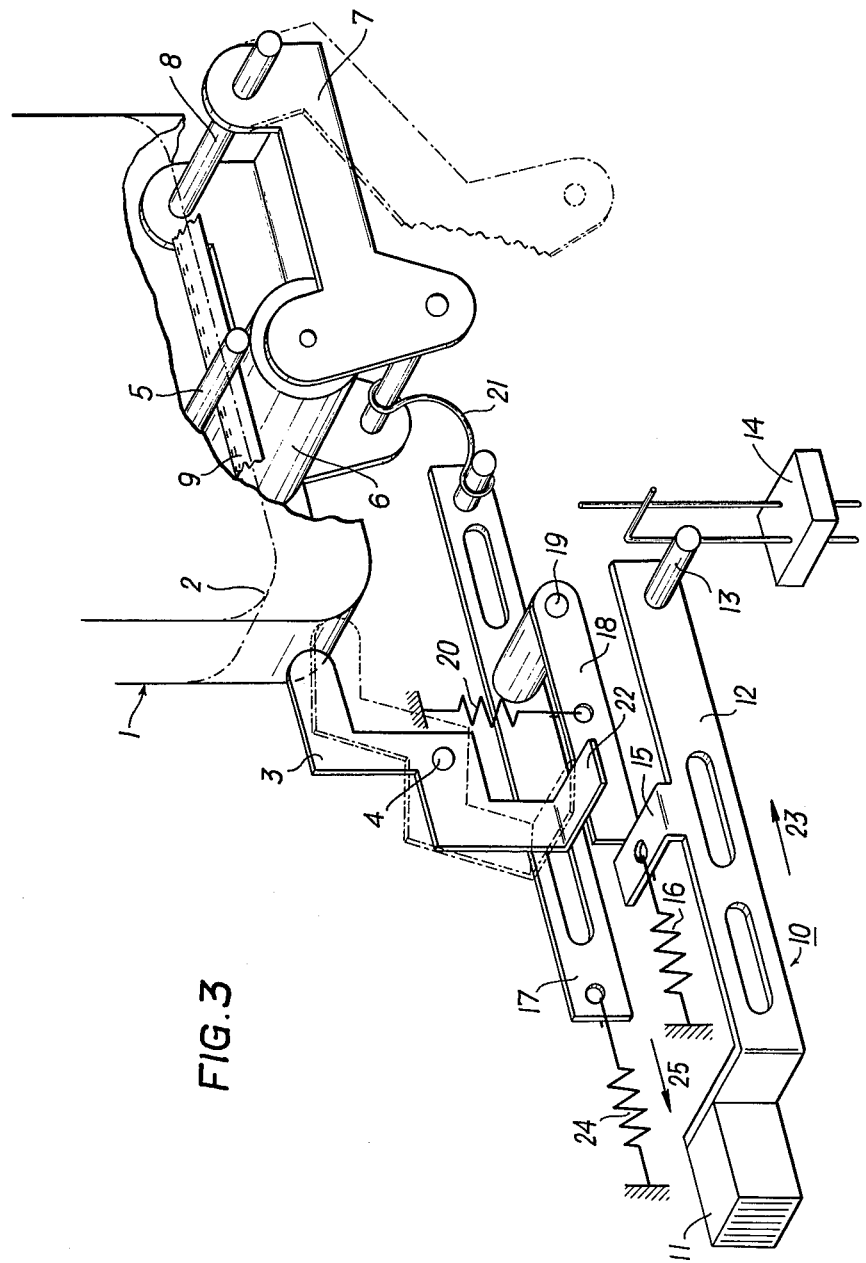
FIG. 3 is a perspective view of the mechanical arrangement of the parts of the invention incorporated in the camera of FIG. 2.

From FIG. 3 it can be seen how the pressure roll 6 co-operating with the capstan 5 is borne on its support 7, which is pivotable about a fixed axis 8. The support 7 is able to take two different positions. In the position of the support 7 shown in heavy lines in FIG. 3, the pressure roll 6 engages the sound-film 9 and the capstan 5, whereas in the dash-dotted position of the support 7, the pressure roll is disengaged from film and capstan.

The release mechanism 10 comprises pushbutton 11 at one end of a release slider 12, the other end of which bears an abutting pin 13 for operating a release switch 14. The release slider 12 is also provided with a protrusion 15, the function of which will be described below. A return spring 16 urges the release slider 12 into inoperative position.

A slider 17 is operatively connected with the sensing lever 3 and supports a catch 18 pivotable about an axis 19. The catch 18 is able to take two different positions shown in FIG. 3 in heavy and in dash-dotted lines. A spring 20 biases the catch 18 in the direction towards the dash-dotted position. On the right end of the slider 17 (with respect to FIG. 3) a tilting spring 21 is fixed, the other end of which is connected with the support 7 for the pressure roll 6.

If a cartridge 1 with tracked sound-film is inserted into the compartment 40 of the camera 30, the sensing lever 3 pivots about its axis 4 taking the position shown in heavy lines. During this pivoting motion, the sensing lever 3 strikes with its lower arm 22 against the catch 18 rotating it counterclockwise about its axis 19. When the user of the camera 30 moves the release button 11 and the release slider 12 in the direction of the arrow 23 against the action of the spring 16, the entrainment surface at the front of the protrusion 15 of the release slider 12 strikes against the catch 18 mounted on the slider 17, so that the slider 17 is also moved in the same direction. Thereby, the pressure roll 6 engages the film and the capstan under the force of the tilting spring 21.

If, however, a silent-film cartridge 2 is inserted into the compartment 40 of the cine-film camera 30, the sensing lever 3 remains in the dash-dotted position under the influence of its spring, whereby the catch 18 is kept in its dash-dotted position by means of its spring 20, in which position the catch 18 is outside the path of the entrainment surface of the protrusion 15. Since the slider 17 is biased by a spring 24 in the direction of the arrow 25 (FIG. 3), it remains in its left position (with respect to FIG. 3) whereby the support 7 takes its dash-dotted position because of the tilting spring 21.

When the user of the camera 30 operates the release button 11, the entrainment surface of the protrusion 15 runs past the catch 18, so that, in this case, the release slider 12 and the slider 17 are uncoupled from one another and the pressure roll 6 is not pivoted against the capstan 5. In this way, unnecessary wear and deformation of the pressure roll 6 during taking of silent-films are avoided and, at the same time, the force necessary for releasing the camera is reduced when silent-film cartridges 2 are used.

We claim:

1. In a sound-film-camera comprising, in combination, a compartment arranged to selectively receive a first or a second cartridge, the first cartridge being of smaller dimensions than the second cartridge and containing silent-film without a magnetic sound-track and the second cartridge being of greater dimensions than the first cartridge and containing sound-film tracked with a magnetic sound-track, sound recording means for continuously driving the sound-film and for recording sound onto the sound-film magnetic sound-track, said sound recording means comprising a capstan and a pressure roll movable in and out of engagement with the sound-film against said capstan, and said sound recording means having at least partly an operative and an inoperative condition, release means for controlling the condition of said sound-recording means and being movable between an inoperative position wherein said sound-recording means is in the operative condition and an operative position, a power transfer mechanism interconnected between said release means and said sound recording means, said power transfer mechanism comprising mechanical coupling means movable between an operative position for transferring movement of said release means to said sound recording means and an inoperative position for interrupting the interconnection of said power transfer mechanism between said release means and said sound recording means, and sensing means for sensing the type of cartridge inserted into said compartment and for controlling the position of said coupling means, said coupling means being movable into said inoperative position upon the insertion of the first cartridge in said compartment and said coupling means being movable into said operative position upon the insertion of a second cartridge into said compartment to permit said release means to operatively condition said sound recording means.

2. A camera as set forth in claim 1 wherein said power transfer mechanism also comprises a movable member and wherein said coupling means is formed by a catch mounted on said movable member, said catch having a coupling position and an uncoupling position controlled by said sensing means, said release means further comprising an entrainment surface moved along a predetermined path by said release means, said catch in the coupling position extending within said path of the entrainment surface to connect said release means and said movable member together for common movement, said catch in the uncoupling position being removed from said predetermined path.

* * * * *